United States Patent
Nitta et al.

(10) Patent No.: US 11,466,181 B2
(45) Date of Patent: Oct. 11, 2022

(54) METAL PARTICLE-CONTAINING COMPOSITION AND ELECTRICALLY CONDUCTIVE ADHESIVE FILM

(71) Applicant: Furukawa Electric Co., Ltd., Tokyo (JP)

(72) Inventors: Norzafriza Nitta, Tokyo (JP); Tomohiro Ishii, Tokyo (JP); Hidemichi Fujiwara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 17/359,372

(22) Filed: Jun. 25, 2021

(65) Prior Publication Data

US 2021/0317343 A1 Oct. 14, 2021

Related U.S. Application Data

(63) Continuation of application No. PCT/JP2020/009929, filed on Mar. 9, 2020.

(30) Foreign Application Priority Data

Mar. 15, 2019 (JP) .............................. JP2019-047863

(51) Int. Cl.
| | |
|---|---|
| *C09J 9/02* | (2006.01) |
| *C09J 7/35* | (2018.01) |
| *C09J 11/06* | (2006.01) |
| *C09J 179/08* | (2006.01) |
| *C22C 13/02* | (2006.01) |
| *B23K 35/26* | (2006.01) |
| *C08K 3/08* | (2006.01) |

(52) U.S. Cl.
CPC . *C09J 9/02* (2013.01); *C09J 7/35* (2018.01); *C09J 11/06* (2013.01); *C09J 179/08* (2013.01); *C22C 13/02* (2013.01); *B23K 35/262* (2013.01); *C08K 2003/085* (2013.01); *C08K 2003/0806* (2013.01); *C08K 2003/0831* (2013.01); *C08K 2003/0856* (2013.01); *C08K 2003/0862* (2013.01); *C08K 2003/0893* (2013.01); *C08K 2201/001* (2013.01); *C08K 2201/005* (2013.01); *C08K 2201/011* (2013.01); *C09J 2203/326* (2013.01); *C09J 2301/304* (2020.08); *C09J 2301/408* (2020.08); *C09J 2479/08* (2013.01)

(58) Field of Classification Search
CPC ..... C09J 9/02; H01L 21/6836; B23K 35/3618
See application file for complete search history.

(56) References Cited

U.S. PATENT DOCUMENTS

| | | | |
|---|---|---|---|
| 2010/0221559 A1* | 9/2010 | Konno | ............... B23K 35/3618 252/514 |
| 2014/0209416 A1 | 7/2014 | Felis et al. | |
| 2017/0152411 A1 | 6/2017 | Mihara et al. | |
| 2018/0026003 A1 | 1/2018 | Mihara et al. | |
| 2018/0294242 A1 | 10/2018 | Mihara et al. | |
| 2018/0346767 A1 | 12/2018 | Mihara et al. | |
| 2018/0346768 A1* | 12/2018 | Sato | ................... H01L 21/6836 |
| 2019/0016928 A1 | 1/2019 | Mihara et al. | |

FOREIGN PATENT DOCUMENTS

| | | | | |
|---|---|---|---|---|
| CN | 107075317 A | 8/2017 | | |
| CN | 108473824 A | 8/2018 | | |
| CN | 108473831 A | 8/2018 | | |
| JP | 2000309773 A | 11/2000 | | |
| JP | 2001143529 A * | 5/2001 | ............. | B23K 35/22 |
| JP | 2004160508 A | 6/2004 | | |
| JP | 2010221260 A | 10/2010 | | |
| JP | 6005313 B1 | 10/2016 | | |
| WO | 2011083824 A1 | 7/2011 | | |
| WO | 2014120356 A1 | 8/2014 | | |
| WO | 2016031551 A1 | 3/2016 | | |

OTHER PUBLICATIONS

International Search Report and Written Opinion received in PCT Application No. PCT/JP2020/009929 dated May 26, 2020 (Engl. translation of ISR only).
English Translation of International Preliminary Report on Patentability dated Sep. 16, 2021 received in PCT/JP2020/009929.
English translation of the Written Opinion of the International Search Authority dated May 26, 2020 received in PCT/JP2020/009929.
[English Translation] The First Office Action dated Jul. 25, 2022 for Chinese Patent Application No. 202080005844.9.

* cited by examiner

*Primary Examiner* — Khanh T Nguyen
(74) *Attorney, Agent, or Firm* — Dorsey & Whitney LLP

(57) ABSTRACT

The present disclosure relates to a metal particle-containing composition contains at least one thermosetting resin (R), a hardening agent (H), and at least three types of metal particles (P) different from one another. The metal particles (P) contain a solder alloy particle (P1) containing a tin alloy containing at least one metal (A), wherein the metal (A) is a metal that forms a eutectic crystal with tin at a eutectic temperature of 200° C. or lower, at least one metal particle (P2) containing a metal (B) having a melting point exceeding 420° C. in a bulk, the metal particle (P2) having a melting point higher than a solidus temperature of the solder alloy particle (P1), and at least one metal particle (P3) containing a metal (C) that forms an intermetallic compound with a metal contained in the solder alloy particle (P1).

15 Claims, No Drawings

METAL PARTICLE-CONTAINING COMPOSITION AND ELECTRICALLY CONDUCTIVE ADHESIVE FILM

CROSS REFERENCE TO RELATED APPLICATIONS

The present application is a continuation application of International Patent Application No. PCT/JP2020/009929 filed on Mar. 9, 2020, which claims the benefit of Japanese Patent Application No. 2019-047863, filed on Mar. 15, 2019. The contents of these applications are incorporated herein by reference in their entirety.

BACKGROUND

Technical Field

The present disclosure relates to a metal particle-containing composition and an electrically conductive adhesive film formed using the metal particle-containing composition.

Description of the Related Art

A semiconductor apparatus is generally produced through a step of forming a die mounting material for bonding a semiconductor element (chip) on an element-carrying part of a lead frame or on a circuit electrode part of an insulating substrate, a step of loading the semiconductor element on the lead frame or on the surface of the die mounting material on the circuit electrode to bond the element-carrying part of the lead frame or the circuit electrode part of the insulating substrate, and the semiconductor element, a wire-bonding step of electrically bonding an electrode part of the semiconductor element and a terminal part of the lead frame or a terminal part of the insulating substrate, and a molding step of covering a semiconductor apparatus thus assembled with a resin.

When the element-carrying part of the lead frame or the circuit electrode part of the insulating substrate, and the semiconductor element are bonded, a bonding material is used. For example, as a bonding material for a power semiconductor, such as IGBT or MOS-FET, lead solder containing 85% by mass or more of lead, the lead solder having a high melting point and heat resistance, is widely known. However, in recent years, the toxicity of lead has been regarded as a problem and a need for making the bonding materials free of lead has also been increasing.

In addition, a SiC power semiconductor has a lower loss and can be operated at a higher speed and at a higher temperature as compared to a Si power semiconductor, and is therefore expected as a next generation power semiconductor. Although such a SiC power semiconductor can theoretically be operated at 200° C. or higher, improvements in heat resistance of peripheral materials including a bonding material have been desired for putting high-output and high-densification of a system, such as an inverter, into practical use.

From such a background, a metal paste of lead-free solder, such as sintered silver, or Sn—Bi-based, Cu—Sn-based, or Cu—Ag—Sn-based lead-free solder, has been attracting attention in place of lead solder in recent years. Particularly, sintered silver, and Cu—Sn-based solder that can form an intermetallic compound can be sintered at a relatively low temperature and show a high melting point after sintering, and are therefore extremely useful in that both of the easiness of mounting and the heat resistance after mounting can be achieved.

However, the sintered silver is high in costs and generally needs a high sintering temperature of 300° C. or higher, and therefore easily gives heat damage to other members around a semiconductor element. In addition, the lead-free solder, such as Cu—Sn-based lead-free solder, is poor in wetting spread onto a rear surface electrode of a semiconductor and therefore needs to be applied in a large amount onto the semiconductor chip to be loaded in order to obtain sufficient bonding strength. Therefore, there has been a problem that the balance between protrusion of a bonding material outside the chip and bonding strength is difficult to keep.

To address such a problem, adhesive films each containing an electrically conductive particle dispersed in a binder containing a thermosetting resin, such as an epoxy resin or an acrylic resin, are proposed (Japanese Patent Application Publication No. 2004-160508, International Publication No. WO 2011083824, and International Publication No. WO 2014120356). The problem which arises when a semiconductor chip is loaded can be solved by pasting any of these adhesive films and a semiconductor wafer together and then dicing the wafer and the adhesive film simultaneously.

However, the heat resistance of these resins is insufficient in a high-temperature environment of, for example, 250° C. or higher, and when any of these resins is combined with an element in which a wide-gap semiconductor, such as SiC, is used, it has been difficult to utilize the excellent heat resistance of the element sufficiently. Although the heat resistance can be improved by enhancing the crosslinking density of the thermosetting resin, such as an epoxy resin or an acrylic resin, the hardness of a hardened product of the resin is made excessive. Therefore, stress-relaxing ability after mounting is deficient, a bend of a semiconductor chip, a lead frame, or the like has occurred in some cases.

To address the problem of the balance between the heat resistance in a high-temperature environment and the stress relaxation, application of a silicone resin as a binder in place of the thermosetting resin, such as an epoxy resin or an acrylic resin, is proposed (International Publication No. WO 2016031551). A silicone resin is excellent in heat resistance and is soft, and therefore can impart stress-relaxing ability to an adhesive film and suppress the bend of a lead frame, a semiconductor chip, or the like. On the other hand, it is desirable that the type of the binder be not limited to a silicone resin and other resins can be used from the viewpoint of practicality and versatility.

As another bonding material, a material of a type such that a low-melting-point solder particle and a metal particle having a high melting point are dispersed in a binder of a thermosetting resin has been attracting attention. Effects such as preventing protrusion of a bonding material outside a chip after heating connection, improving stress-relaxing properties after mounting, and improving corrosion preventiveness to a metal are expected by dispersing these metal particles in the thermosetting resin binder. However, the temperature during mounting is a low temperature of 200° C. or lower, and therefore, for example, if a tin alloy containing a metal that forms a eutectic crystal with tin is used as a low-melting-point solder powder, the metal which has formed a eutectic crystal with tin in a bonding process utilizing a diffusion reaction of tin to the high-melting-point metal particle, or to a substrate or a chip electrode segregates, so that a barrier layer which inhibits the diffusion reaction of tin is formed. Due to the inhibition of the diffusion reaction of tin by the barrier layer, formation of a bonding part does not progress sufficiently, and as a result, there have been problems that the strength and heat resistance (heat dissipation) of a resultant bonding part are inferior, and further, that a satisfactory bonding state is not obtained under a severe condition.

SUMMARY

The present disclosure is related to providing a metal particle-containing composition which achieves bonding between metals in electronic components and the like in a lead-free manner, enables bonding with excellent strength and heat resistance and, further, can retain a satisfactory bonding state even under a severe condition, and an electrically conductive adhesive film formed using the metal particle-containing composition.

According to an aspect of the present disclosure, a metal particle-containing composition contains at least one thermosetting resin (R), a hardening agent (H), and at least three types of metal particles (P) different from one another. The metal particles (P) contain a solder alloy particle (P1) containing a tin alloy containing at least one metal (A), wherein the metal (A) is a metal that forms a eutectic crystal with tin at a eutectic temperature of 200° C. or lower; at least one metal particle (P2) containing a metal (B) having a melting point exceeding 420° C. in a bulk, the metal particle (P2) having a melting point higher than a solidus temperature of the solder alloy particle (P1); and at least one metal particle (P3) containing a metal (C) that forms an intermetallic compound with a metal contained in the solder alloy particle (P1).

According to one aspect of the present disclosure, the metal (A) is at least any one of bismuth, silver, zinc, and indium.

According to one aspect of the present disclosure, the metal (B) is at least any one of copper, silver, and gold.

According to one aspect of the present disclosure, the metal (C) is at least any one of nickel and iron.

According to one aspect of the present disclosure, a particle diameter (d50) of primary particles of the solder alloy particle (P1) is more than 500 nm and 50 μm or less.

According to one aspect of the present disclosure, a particle diameter (d50) of primary particles of the metal particle (P2) is more than 1 nm and 50 μm or less.

According to one aspect of the present disclosure, a particle diameter (d50) of primary particles of the metal particle (P3) is more than 10 nm and 50 μm or less.

According to one aspect of the present disclosure, a content of the solder alloy particle (P1) contained in the metal particle-containing composition is 50 to 95% by mass based on a total content of the metal particles (P).

According to one aspect of the present disclosure, a content of the metal particle (P2) contained in the metal particle-containing composition is 2.5 to 30% by mass based on a total content of the metal particles (P).

According to one aspect of the present disclosure, content of the metal particle (P3) contained in the metal particle-containing composition is 2.5 to 20% by mass based on a total content of the metal particles (P).

According to one aspect of the present disclosure, the metal particle-containing composition further contains a flux having one or more phosphor or sulfur atoms in a molecular structure, the phosphor or sulfur atoms being capable of bonding to an oxygen atom without generation of water.

According to one aspect of the present disclosure, the flux contains at least one of an organic phosphine represented by the following formula (6), a sulfide-based compound represented by the following formula (7), and a thiol-based compound represented by the following (8);

provided that R in the following formulas (6), (7), and (8) each independently represent an organic group and are optionally the same with or different from one another.

[Formula 1]

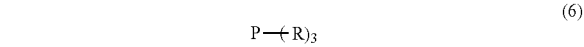

According to one aspect of the present disclosure, the organic phosphine contains 4-(diphenylphosphino)styrene.

According to one aspect of the present disclosure, the sulfide-based compound contains at least one of bis(hydroxyphenyl)sulfide, bis(4-acryloylthiophenyl)sulfide, 2-methylthiophenothiazine, bis(2-methacryloylthioethyl)sulfide, and bis(4-methacryloylthiophenyl)sulfide.

According to one aspect of the present disclosure, the thiol-based compound contains at least one of 2-dibutylamino-4,6-dimercapto-s-triazine, 2,4,6-trimercapto-s-triazine, 2-pyridinethiol, 2-pyridinemethanethiol, and 3-pyridinemethanethiol.

According to another aspect of the present disclosure, an electrically conductive adhesive film is formed by the metal particle-containing composition according to the present disclosure.

According to the present disclosure, bonding between metals in electronic components and the like is achieved in a lead-free manner, bonding with excellent strength and heat resistance is enabled, and, further, a satisfactory bonding state can be retained even if a reliability test, such as a heat shock test or a power cycle test, is carried out under a severe condition.

DETAILED DESCRIPTION

Hereinafter, embodiments of a metal particle-containing composition according to the present disclosure and of an electrically conductive adhesive film formed using the metal particle-containing composition according to the present disclosure will be described in detail.

<Metal Particle-Containing Composition>

The metal particle-containing composition of the present embodiment contains: at least three types of metal components (P) different from one another; at least one thermosetting resin (R) as a binder component; and a hardening agent (H) as a hardening action component. If necessary, the metal particle-containing composition may further contain various types of additives optionally.

[Metal Components (P)]

The metal particle-containing composition of the present embodiment contains at least three metal components (P) different from one another, and the metal components (P) specifically contains: a solder alloy particle (P1) containing a tin alloy containing at least one metal (A), wherein the metal (A) is a metal that forms a eutectic crystal with tin at a eutectic temperature of 200° C. or lower; at least one metal particle (P2) containing a metal (B) having a melting point exceeding 420° C. in a bulk, the metal particle (P2) having a melting point higher than a solidus temperature of the solder alloy particle (P1); and at least one metal particle (P3) containing a metal (C) that forms an intermetallic compound with a metal contained in the solder alloy particle (P1). It is to be noted that the "metal particle" herein not only means a metal particle containing a single metal component but also means an alloy particle containing two or more metal components unless otherwise mentioned.

(Solder Alloy Particle (P1))

The solder alloy particle (P1) is a metal particle containing a tin alloy preferably containing 70% by mass or more, more preferably containing 80% by mass or more, and still more preferably 90% by mass of tin (Sn) as the main component. Such a tin alloy contains at least one metal (A) that forms a eutectic crystal with tin at a eutectic temperature of 200° C. or lower and, on the other hand, does not substantially contain a toxic metal, such as lead, mercury, and arsenic. It is preferable that the contents of these toxic metals in the tin alloy be less than 0.1% by mass in total. That is, the solder alloy particle (P1) is a low-temperature metal particle containing a solder component which is substantially lead-free. When the metal particle-containing composition contains the solder alloy particle (P1), mounting utilizing lead-free solder at a low temperature of 200° C. or lower, preferably 150° C. or lower is thereby enabled. It is to be noted that the lower limit value of the eutectic temperature is different depending on the combination with the metal (A) contained in the tin alloy, but it is preferable that the lower limit value of the eutectic temperature be 100° C. or higher, more preferably 130° C. or higher.

It is preferable that the metal (A) be at least any one of bismuth (Bi), silver (Ag), zinc (Zn), and indium (In), more preferably at least any one of bismuth, zinc, and indium. The metal (A) contained in the tin alloy may be one of these, or may be two or more of these. In addition, the content of one, or two or more metals (A) contained in the tin alloy is different depending on the content of tin, but it is preferable that the content of one, or two or more metals (A) contained in the tin alloy be 30% by mass or less, more preferably 20% by mass or less, and still more preferably 10% by mass. Examples of the solder alloy particle (P1) containing such a tin alloy include a solder alloy particle having a composition such as $Sn_{72}Bi_{28}$ (72% by mass of Sn-28% by mass of Bi), $Sn_{91}Zn_9$ (91% by mass of Sn-9% by mass of Zn), or $Sn_{92}$—$Ag_{3.5}$—$Bi_{0.5}$—$In_4$ (92% by mass of Sn-3.5% by mass of Ag-0.5% by mass of Bi-4% by mass of In).

It is preferable that the content of the solder alloy particle (P1) contained in the metal particle-containing composition be 50 to 95% by mass, more preferably 80 to 93% by mass based on the total content of the metal components (P). In addition, it is preferable that the particle diameter (d50) of primary particles of the solder alloy particle (P1) be more than 500 nm and 50 µm or less, more preferably 1 µm or more and 30 µm or less in order to form a molten state of the solder alloy particle (P1) quickly in heating connection. It is to be noted that the particle diameter (d50) can be calculated based on the measurement utilizing, for example, a laser diffraction scattering type particle size distribution measuring method. The particle diameter (d50) of the other metal components, which will be mentioned later, can also be calculated by the same measurement.

(Metal Particle (P2))

The metal particle (P2) contains a metal (B) having a melting point exceeding 420° C. in a bulk and has a melting point higher than the solidus temperature of the solder alloy particle (P1). The melting point in a bulk herein means a melting point where melting point depression depending on the metal particle diameter does not appear remarkably. By using the metal particle (P2) containing a metal (B) having a melting point exceeding 420° C., alloying with the solder alloy particle (P1) at a temperature lower than 420° C. is prevented, and on the hand, when a bonding part is formed by heating, an alloy is formed with the solder alloy particle (P1) in which the metal (B) is in a molten state. Thereby, the melting point of the bonding part after cooling is retained at a relatively high temperature, so that the heat resistance is improved, and therefore realloying due to mutual fusion can be prevented.

It is preferable that the metal (B) be at least any one of copper (Cu), silver (Ag), and gold (Au) from the viewpoint of imparting electrical conductivity to a bonding part, more preferably copper from the viewpoint of costs. The metal particle (P2) which is formed from these metals (B) may be used singly, or two or more metal particles (P2) which are each formed from these metals may be used together.

It is preferable that the content of the metal particle (P2) contained in the metal particle-containing composition be 2.5 to 30% by mass, more preferably 4 to 15% by mass based on the total content of the metal components (P). In addition, it is preferable that the particle diameter (d50) of primary particles of the metal particle (P2) be more than 1 nm and 50 µm or less, more preferably 0.01 µm or more and 10 µm or less. Particularly when the particle diameter (d50) of the metal particle (P2) is made small to nanometer size, the number of constituent atoms per particle is made small, and the surface area to the volume of the particles increases rapidly, so that the surface energy increases. Therefore, the melting point and sintering temperature are lowered as compared to the metal in a bulk state. The tendency is remarkable when the particle diameter (d50) of the metal particle (P2) is 100 nm or less, and particularly when the metal particle (P2) having a particle diameter (d50) of about 10 to about 20 nm is used, a particle of a nano order and elements in solder undergo a diffusion reaction at a temperature where the solder melts, thereby enabling formation of an alloy phase, so that there is an effect of allowing the reaction to progress from a low temperature.

(Metal Particle (P3))

The metal particle (P3) is a particle containing a metal (C) that forms an intermetallic compound with a metal contained in the solder alloy particle (P1). The metal (C) is not only different from the metal (A) which the solder alloy particle (P1) has but also different from the metal (B) which the metal particle (P2) has. When the metal particle (P3) containing a metal (C) capable of forming an intermetallic compound with a metal contained in the solder alloy particle (P1) is further contained as a metal component (P) in the metal particle-containing composition, a pinning effect of suppressing the segregation of the metal that forms a eutectic crystal with tin by a resultant intermetallic compound while melting tin which is the main component of the solder alloy particle (P1) by the eutectic is thereby exhibited. Thereby, formation of a barrier layer which inhibits the diffusion reaction of tin can be prevented. Thus, even in mounting at a low temperature of 200° C. or lower, a solder alloy particle containing a tin alloy can effectively be utilized in a thermosetting resin binder. As a result, lowering the strength of a bonding part and lowering the heat resistance of a bonding part can be inhibited, and, further, retaining a satisfactory bonding state is retained even if a reliability test, such as a heat shock test or a power cycle test, is carried out under a severe condition. In addition, such a metal particle-containing composition is also suitably applicable to formation of an electrically conductive adhesive film which is used as a bonding material for bonding electronic components, such as, for example, a semiconductor chip (particularly power device), and a circuit electrode part on an element-carrying part of a lead frame or a circuit electrode part of an insulating substrate.

It is preferable that the metal (C) be at least any one of nickel (Ni) and iron (Fe) as an element capable of forming an intermetallic compound by bonding to a metal contained in the solder alloy particle (P1), and from the viewpoint of easiness of forming an intermetallic compound, nickel is particularly preferable. The metal particle (P3) containing these metals (C) may be used singly, or two or more metal particles (P3) each containing these metals (C) may be used together. Examples of such an intermetallic compound include Ni—Bi, Ni—In, Ni—Bi$_3$, Ni$_2$Zn$_{11}$, Ni$_5$—In$_3$, Fe$_3$—Zn$_{10}$, Fe$_5$—Zn$_{21}$, and Fe—Zn$_7$.

It is preferable that the content of the metal particle (P3) contained in the metal particle-containing composition be 2.5 to 20% by mass, more preferably 3 to 5% by mass based on the total content of the metal components (P). In addition, it is preferable that the particle diameter (d50) of primary particles of the metal particle (P3) be more than 10 nm and 50 μm or less, more preferably 0.1 μm or more and 10 μm or less, and still more preferably 0.1 μm or more and 1 μm or less. Particularly when the particle diameter (d50) of the metal particle (P3) is 1 μm or less, the metal contained in the solder alloy particle (P1) and the metal (C) contained in the metal particle (P3) thereby easily bonds to each other, and, as a result, a pinning effect of suppressing the grain growth of a precipitate attributable to the segregation of the metal that forms a eutectic crystal with tin can be enhanced.

[Binder Component]

The metal particle-containing composition of the present embodiment contains at least one thermosetting resin (R) as a binder component. When an electrically conductive adhesive film is made using the metal particle-containing composition, the metal particle-containing composition contributes to film properties (such as easiness of molding and easiness of handling) in an unsintered state and, in a state after sintering, plays a role of relaxing stress or the like that is generated between a semiconductor element and a base material (such as a lead frame) due to a heat cycle by containing the thermosetting resin (R).

Particularly from the viewpoint of film properties and heat resistance at the time when various metal particles and a metal particle are mixed, it is preferable that the thermosetting resin (R) contain a maleic acid imide resin (hereinafter, sometimes referred to as "maleimide resin") containing a maleic acid imide compound having two units or more of imide groups in one molecule or an epoxy resin having a molecular skeleton derived from a glycidyl ether of an aliphatic diol, and the thermosetting resin (R) more preferably contains a maleic acid imide resin. The thermosetting resin (R) containing any of the resins in particular is excellent in stress-relaxing properties, and therefore when an electrically conductive adhesive film is made using the metal particle-containing composition, thermal fatigue resistance of the electrically conductive adhesive film after sintering can be improved. As a result, being hard and brittle, which is a drawback in the thermal fatigue resistance of conventional lead-free solder composed of only metals, can be overcome due to the electrically conductive adhesive film containing such a thermosetting resin (R).

The maleic acid imide resin is obtained by, for example, condensing maleic acid or an anhydride thereof, and a diamine or a polyamine. In addition, from the viewpoint of stress-relaxing properties, it is preferable that the maleic acid imide resin have a skeleton derived from an aliphatic amine having 10 or more carbon atoms, more preferably a skeleton particularly derived from an aliphatic amine such as the one having 30 or more carbon atoms, the aliphatic amine represented by the following formula (1). In addition, it is preferable that the number average molecular weight of the maleic acid imide compound be 3000 or more.

[Formula 2]

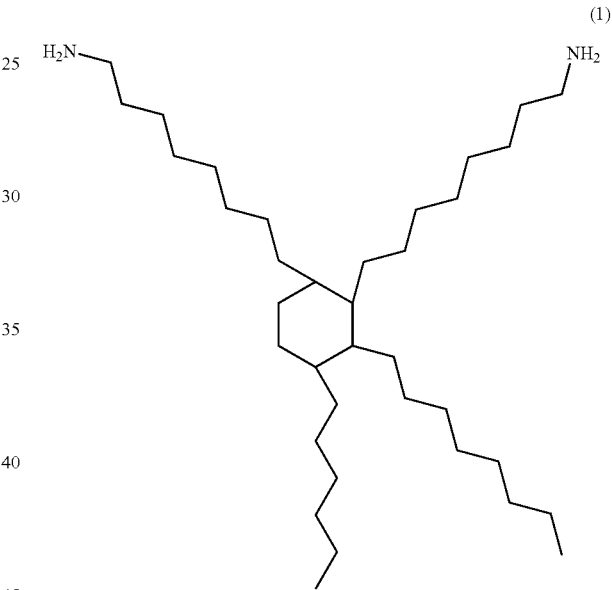

(1)

The maleic acid imide resin may further contain a skeleton derived from an acid component other than maleic acid, for example, a benzenetetracarboxylic acid or an anhydride thereof, hydroxyphthalic acid bisether or an anhydride thereof, or the like in order to adjust the molecular weight, the glass transition temperature Tg, or the like. For example, bismaleimide resins and the like represented by the following formulas (2) to (4) are each suitably used as such a maleic acid imide resin.

[Formula 3]

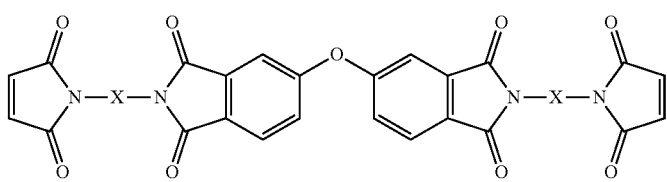

(2)

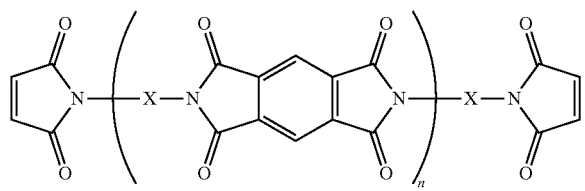

(3)

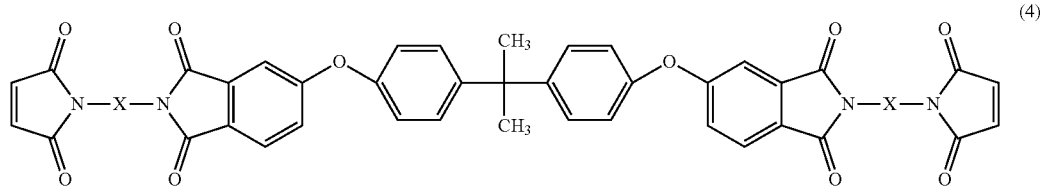

(4)

However, in the formula (3), n is an integer of 1 to 10. In addition, in the formulas (2) to (4), the part "X" is a skeleton of "$C_{36}H_{72}$" represented by the following formula (5). It is to be noted that in the following formula (5), "*" means a site of bonding to N.

[Formula 4]

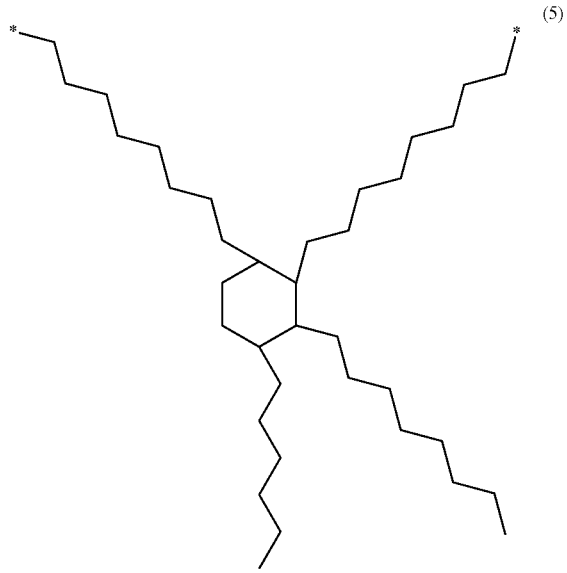

(5)

Examples of the epoxy resin having a molecular skeleton derived from a glycidyl ether of an aliphatic diol include an ethylene glycol-modified type epoxy resin, a propylene glycol-modified type epoxy resin, and a butanediol-modified type epoxy resin. These epoxy resins are preferable from the viewpoint of flexibility. In addition, when such an epoxy resin is used by being mixed with a bisphenol A type epoxy resin, a bisphenol F type epoxy resin, a phenoxy resin, which is an epoxy resin having a large molecular weight, or the like, both of the adhesive strength and the flexibility can thereby be achieved.

It is preferable that the content of the thermosetting resin (R) contained in the metal particle-containing composition of the present embodiment be 4 to 30% by mass, more preferably 6 to 20% by mass based on the metal particle-containing composition. When an electrically conductive adhesive film is made using the metal particle-containing composition, the electrically conductive adhesive film which is excellent in film properties (such as easiness of molding and easiness of handling) in an unsintered state and, in a sintered state, is excellent in properties of relaxing stress or the like that is generated between a semiconductor element and a base material (such as a lead frame) due to a heat cycle can be obtained by controlling the content of the thermosetting resin (R) into the range. The thermosetting resin (R) may be used singly, or two or more resins may be used together. In addition, if necessary, the metal particle-containing composition may further contain a thermosetting resin other than those described above.

[Hardening Action Component]

The metal particle-containing composition of the present embodiment contains, as a hardening action component, a hardening agent (H) that facilitates hardening of the thermosetting resin (R). In the case where the maleic acid imide resin is used as the thermosetting resin (R), examples of the hardening agent (H) include a noble metal, an organic peroxide, a diazo compound, an acyloin, an aromatic ketone, a radical generating agent such as 2,3-diphenylbutane, and a phenol novolak resin. In the case where a radical generating agent is used as the hardening agent (H), 2,3-dimethyl-2,3-diphenylbutane is preferable from the viewpoint of suppressing inhibition of an intermetallic reaction due to excessively quick progress of a crosslinking reaction with the maleic acid imide resin and making it easy to obtain low volume resistivity by performing sintering sufficiently at a temperature of 250° C. or lower.

In the case where the epoxy resin is used as the thermosetting resin (R), examples of the hardening agent (H) include an acid anhydride, a phenol novolak resin, an amine, an imidazole-based compound, and dicyandiamide, and among these, a phenol novolak resin and an imidazole-based compound are preferable. In addition, in the case where a phenol novolak resin is used as the hardening agent (H), the maleic acid imide resin or the epoxy resin, and the phenol novolak resin are reacted and a phenol novolak type maleic acid imide resin or epoxy resin is formed. Thereby, when an electrically conductive adhesive film is made using the metal particle-containing composition, the heat resistance of the electrically conductive adhesive film can be improved more.

The content of the hardening agent (H) contained in the metal particle-containing composition of the present embodiment is different depending on the combination of the thermosetting resin (R) and hardening agent (H) to be selected, but, in one embodiment, it is preferable that the content of the hardening agent (H) contained in the metal particle-containing composition of the present embodiment be 0.1 to 20 parts by mass, more preferably 0.5 to 10 parts by mass per 100 parts by mass of the thermosetting resin (R). The hardening agent (H) may be used singly, or two or more resins may be used together. In addition, if necessary, the metal particle-containing composition may further contain a hardening agent other than those described above.

[Flux]

The metal particle-containing composition of the present embodiment may further contain a flux having one or more phosphor atoms or sulfur atoms in a molecular structure, the phosphor atoms or sulfur atoms capable of bonding to an oxygen atom without generation of water. The flux has a function of removing an oxide film on the surfaces of the metal particles contained in the metal particle-containing composition and acts more effectively on an easily oxidizable metal in particular, such as copper, tin, nickel, and aluminum. As such a flux, an organic phosphine, a sulfide-based compound, and a thiol-based compound are preferable, and these compounds are extremely unlikely to absorb moisture and is excellent in hygroscopicity resistance as compared to fluxes such as a carboxylic acid and an alcohol, which have generally been used in the past.

It is preferable that the flux contain at least one of, for example, an organic phosphine represented by the following formula (6), a sulfide-based compound represented by the following formula (7), and a thiol-based compound represented by the following (8), provided that R in the following formulas (6) and (7) each independently represent an organic group and are optionally the same with or different from one another.

[Formula 5]

$$P\!-\!(R)_3 \quad (6)$$

$$S\!-\!(R)_2 \quad (7)$$

$$R\!-\!S\diagdown_{H} \quad (8)$$

It is preferable that in the formulas (6), (7), and (8), R be each independently selected from an alkyl group, an aryl group, an organic group having a functional group, an organic group having a hetero atom, and an organic group having an unsaturated bond, and it is preferable that at least one of R be an aryl group.

The alkyl group may be any of a straight-chain alkyl group, a branched alkyl group, and a cyclic alkyl group, and may have a substituent. It is preferable that the alkyl group be a straight-chain alkyl group or a branched alkyl group. In addition, it is preferable that the alkyl group have 3 or more carbon atoms, more preferably 4 to 18 carbon atoms, and still more preferably 6 to 15 carbon atoms. Examples of such an alkyl group include a propyl group, a butyl group, a pentyl group, a hexyl group, a heptyl group, an octyl group, a nonyl group, a decyl group, a stearyl group, and an isostearyl group.

The aryl group may have a substituent, and it is preferable that the aryl group have 6 to 10 carbon atoms. Examples of such an aryl group include a phenyl group, a tolyl group, a xylyl group, a cumenyl group, and a 1-naphtyl group.

It is preferable that the organic group having a functional group have 1 to 10 carbon atoms, more preferably 1 to 6 carbon atoms, and still more preferably 1 to 3 carbon atoms. Examples of the functional group include halogen groups, such as a chloro group, a bromo group, and a fluoro group. Examples of the organic group having such a functional group include a chloroethyl group, a fluoroethyl group, a chloropropyl group, a dichloropropyl group, a fluoropropyl group, a difluoropropyl group, a chlorophenyl group, and a fluorophenyl group.

It is preferable that the organic group having a hetero atom have one or more carbon atoms, more preferably 4 to 18 carbon atoms, and still more preferably 6 to 15 carbon atoms. Examples of the hetero atom include a nitrogen atom, an oxygen atom, and a sulfur atom. Examples of the organic group having such a hetero atom include a dimethylamino group, a diethylamino group, a diphenylamino group, a methyl sulfoxide group, an ethyl sulfoxide group, and a phenyl sulfoxide group.

It is preferable that the organic group having an unsaturated bond have 3 or more, carbon atoms more preferably 4 to 18 carbon atoms, and still more preferably 6 to 15 carbon atoms. Examples of such an organic group having an unsaturated bond include a propenyl group, a propynyl group, a butenyl group, a butynyl group, an oleyl group, a phenyl group, a vinylphenyl group, and an alkylphenyl group, and among these, it is preferable that the organic group having an unsaturated bond be a vinylphenyl group.

In addition, it is preferable that in the formulas (6), (7), and (8), R each independently have, in a part thereof, any one or more selected from a vinyl group, an acrylic group, a methacrylic group, a maleic acid ester group, a maleic acid amide group, a maleic acid imide group, a primary amino group, a secondary amino group, a thiol group, a hydrosilyl group, a hydroboron group, a phenolic hydroxy group, and an epoxy group. Among these, a vinyl group, an acrylic group, a methacrylic group, a secondary amino group, and a thiol group are more preferred groups.

It is preferable that the organic phosphine specifically contain 4-(diphenylphosphino)styrene. Such a compound has a highly reactive vinyl group and is therefore suitable in that it is low in bleed-out.

It is preferable that the sulfide-based compound specifically contain at least one of bis(hydroxyphenyl)sulfide, bis(4-acryloylthiophenyl)sulfide, 2-methylthiophenothiazine, bis(2-methacryloylthioethyl)sulfide, and bis(4-methacryloylthiophenyl)sulfide, more preferably at least one of bis(4-acryloylthiophenyl)sulfide and bis(4-methacryloylthiophenyl)sulfide. Among these compounds, the sulfide-based compound having a highly reactive phenolic hydroxy group, acrylic group, or methacrylic group is suitable in that it is low in bleed-out, and among them, the sulfide-based compound having an acrylic group or a methacrylic group is most suitable.

It is preferable that the thiol-based compound specifically contain at least one of 2-dibutylamino-4,6-dimercapto-s-triazine, 2,4,6-trimercapto-s-triazine, 2-pyridinethiol, 2-pyridinemethanethiol, and 3-pyridinemethanethiol. Such a compound has a highly reactive thiol group and is therefore suitable in that it is low in bleed-out.

The organic phosphine, the sulfide-based compound, and the thiol-based compound can each be used singly, but two or more thereof may be used together. When an electrically conductive adhesive film is made using the metal particle-containing composition, the metal particle-containing composition of the present embodiment can improve the adhesive force of the electrically conductive adhesive film by containing two or more of the organic phosphine, the sulfide-based compound, and the thiol-based compound as the flux.

In the case where the above-mentioned thermosetting resin (R) contains a maleimide resin, each of such an organic phosphine, a sulfide-based compound, and a thiol-based compound can form a copolymer with the maleimide resin and therefore also acts as a thermosetting resin component. In addition, each of the organic phosphine, the sulfide-based compound, and the thiol-based compound is less likely to absorb moisture, has a sufficiently large molecular weight, and is polymerizable, and therefore bleed-out can effectively be prevented when used as a flux component. Accordingly, by using each of such an organic phosphine, a sulfide-based compound and a thiol-based compound in place of an alcohol or carboxylic acid which easily absorbs moisture, the risk of bleed-out can be reduced without performing flux cleaning, so that sufficient reliability, and reflow resistance particularly after moisture absorption can be secured.

In addition, it is preferable that the number average molecular weight of the organic phosphine, the sulfide-based compound, and the thiol-based compound be 260 or higher from the standpoint of suppressing bleed-out during sintering or on other occasions. When the number average molecular weight of the organic phosphine, the sulfide-based compound, and the thiol-based compound is 260 or higher, and the maleimide resin and each of these are reacted to be hardened as mentioned above, bleed-out can further be reduced. As a result, contamination on the surface of a substrate (such as a lead frame) due to bleed-out can be prevented, so that reliability of a package can be improved.

It is preferable that the content of the organic phosphine contained in the metal particle-containing composition of the present embodiment be 0.5 to 10.0% by mass, more preferably 1.0 to 5.0% by mass. By controlling the content of the organic phosphine into the range, a capability of removing a metal oxide film is exhibited sufficiently.

It is preferable that the content of the sulfide-based compound contained in the metal particle-containing composition of the present embodiment be 0.5 to 8.0% by mass, more preferably 1.0 to 4.0% by mass. By controlling the content of the sulfide-based compound into the range, a capability of removing a metal oxide film is exhibited sufficiently.

It is preferable that the content of the thiol-based compound contained in the metal particle-containing composition of the present embodiment be 0.5 to 8.0% by mass, more preferably 0.5 to 3.0% by mass. By controlling the content of the thiol-based compound into the range, a capability of removing a metal oxide film is exhibited sufficiently.

In the case where the metal particle-containing composition of the present embodiment contains two or more of the organic phosphine, the sulfide-based compound, and the thiol-based compound as the flux, it is preferable that the total content of these contained in the metal particle-containing composition be 1.0 to 10.0% by mass, more preferably 2.0 to 5.0% by mass.

In addition, the organic phosphine, the sulfide-based compound, and the thiol-based compound may each be used singly, or two or more thereof may be used together.

[Additional Component]

The metal particle-containing composition of the present embodiment may optionally contain various types of additives in addition to the above-described components. If necessary, such additives can appropriately be selected, and examples thereof include a dispersant, a radical polymerization initiator, a leveling agent, and a plasticizer. In addition, a solvent, such as cyclopentanone, toluene, or acetone, may be added into the metal particle-containing composition in order to adjust the viscosity of the metal particle-containing composition.

[Method for Producing Metal Particle-Containing Composition]

It is preferable to produce the metal particle-containing composition of the present embodiment by adding a solder alloy particle (P1), a metal particle (P2), a metal particle (P3), a thermosetting resin (R), and a hardening agent (H), furthermore, if necessary, optionally adding a flux, a solvent, and various types of additives, and kneading a resultant composition in order to improve dispersibility. A known kneading method can be adopted as kneading means, but it is preferable to use a centrifugal kneading method and a mortar kneading method together. The kneading time is not particularly limited and can optionally be selected; however, the longer the kneading time is, the more the dispersibility is improved.

[Intended Use of Metal Particle-Containing Composition]

The metal particle-containing composition of the present embodiment can be utilized as, for example, a wiring formation material for an electronic material, and a bonding material for bonding printed wiring, internal wiring of a semiconductor, a printed wiring board, or the like, and an electronic component to each other, and such a bonding material can be used by making the bonding material into, for example, a paste form or a film form.

<Electrically Conductive Adhesive Film>

The metal particle-containing composition of the present embodiment contains a thermosetting resin having stress-relaxing properties. A sintered body which is formed by sintering the metal particle-containing composition containing a thermosetting resin can overcome the drawback of insufficient thermal fatigue properties attributable to a hard-and-brittle characteristic which conventional lead-free solder composed of only metal components shows and can secure even the film properties before sintering. Therefore, such a metal particle-containing composition is suitable for application to an adhesive film, and it is preferable to use such a metal particle-containing composition as an electrically conductive adhesive film in particular.

The electrically conductive adhesive film which is formed using the metal particle-containing composition of the present embodiment has a film shape. Therefore, for example, when a power semiconductor element is connected to a substrate, handling is easier than that of conventional solder and electrically conductive paste. Specifically, the electrically conductive adhesive film of the present embodiment, when pasted to the rear surface of a wafer with power semiconductors formed thereon, enables separation together with the wafer when the wafer is separated and made into a chip for every element (dicing step). Therefore, the electrically conductive adhesive film can be formed on the whole rear surface of the element (wafer) without excess or deficiency, thereby enabling satisfactory mounting without bringing about the problems of wettability, protrusion, and the like of conventional solder. In addition, the electrically conductive adhesive film can be formed into a predetermined thickness in advance, and therefore controlling the height of an element after die bond can be performed more accurately and easily than in conventional solder and electrically conductive paste.

Production of the electrically conductive adhesive film of the present embodiment is not particularly limited and can be performed by a known method. Examples of the known method include a method in which an appropriate amount of each component to be contained in the metal particle-containing composition is weighed and mixed by a known method, and, further, a resultant mixture is molded into a film form by a known method. Examples of such a mixing method include mixing by stirring with a rotary blade, mixing with a homogenizer, mixing with a planetary mixer, and mixing with a kneader. In addition, examples of the method for molding into a film form include: a method in which a varnish obtained by dissolving/dispersing the above-described mixture in a solvent is applied on a base material, and a resultant coating film is then dried; a melt-application method in which the electrically conductive adhesive film is melted at a high temperature, and a resultant molten material is then applied on a base material; a method in which the electrically conductive adhesive film is pressed together with a base material at a high pressure; an extrusion method in which the electrically conductive adhesive film is melted, and a resultant molten material is then extruded with an extrusion machine and is, further, stretched; and a printing method in which the above-described varnish is filled in a screen mesh (screen printing) or a metal plate (gravure printing) to be transferred.

It is preferable that the thickness of the electrically conductive adhesive film be 5 to 100 μm, more preferably 20 to 50 μm. By controlling the thickness of the electrically conductive adhesive film within the range, not only suppressing electric resistance and thermal resistance but also obtaining sufficient adhesive force are enabled.

The heat resistant temperature of the electrically conductive adhesive film is preferably 250° C. or higher, more preferably 300° C. or higher. In addition, in the case where the electrically conductive adhesive film is used for mounting, the temperature suitable for mounting is preferably 100 to 250° C., more preferably 100 to 200° C. Such an electrically conductive adhesive film enables sintering (mounting) at a low temperature, exhibits excellent heat resistance after sintering (after mounting), and can prevent occurrence of a defect due to wire-bonding with high-melting-point, lead-free solder, or a reflow treatment.

The electrically conductive adhesive film of the present embodiment may be in the form of a dicing/die bonding film obtained by pasting the electrically conductive adhesive film of the present embodiment and a dicing tape together. Thereby, the electrically conductive adhesive film and the dicing tape can be pasted together to a wafer all at once, and therefore processes can be simplified.

<Electrically Conductive Paste>

In the embodiment, an example in which the metal particle-containing composition is used in the form of an electrically conductive adhesive film is shown, but the metal particle-containing composition can also be used in the form of an electrically conductive paste by reducing the amount of the thermosetting resin to be blended in the metal particle-containing composition. Specifically, after the metal particle-containing composition in a paste form is applied on one of the bodies to be bonded of an electronic component by means of screen printing, a dispenser, or the like and is dried, the other body to be bonded is placed on a resultant coating film to sinter the coating film. Thereby, bonding electronic components to each other is also enabled in the form of an electrically conductive paste.

The embodiments of the present disclosure have been described above; however, the present disclosure is not limited to the embodiments and includes all the aspects included in the concept and claims of the present disclosure, and various modifications can be performed within the scope of the present disclosure.

EXAMPLES

Hereinafter, the present disclosure will be described in more detail based on Examples, but the present disclosure is not limited to those.

Materials used in each component are described below. It is to be noted that % means % by mass unless otherwise noted.

[Metal Components (P)]
<Solder Alloy Particle (P1)>
Sn—Bi Powder (composition: $Sn_{72}Bi_{28}$) (ST-3 manufactured by MITSUI MINING & SMELTING CO., LTD.)
Particle diameter (d50): 3 μm
Metal (A): bismuth (Bi)
Sn—Zn Powder (composition: $Sn_{91}Zn_9$) (Z90 manufactured by MITSUI MINING & SMELTING CO., LTD.)
Particle diameter (d50): 15 μm
Metal (A): zinc (Zn)
Sn—Ag—Bi—In Powder (composition: $Sn_{92}$—$Ag_{3.5}$—$Bi_{0.5}$—$In_4$) (DS10 manufactured by MITSUI MINING & SMELTING CO., LTD.)
Particle diameter (d50): 15 μm
Metal (A): indium (In), bismuth (Bi)
<Metal Particle (P2)>
Cu Powder (MA-005K manufactured by MITSUI MINING & SMELTING CO., LTD.)
Particle diameter (d50): 5 μm
Cu Nanoparticle (manufactured by Furukawa Electric Co., Ltd.)
Particle diameter (d50): 10 nm to 100 nm (0.01 μm to 0.1 μm)
Liquid phase reduction or electrolytic reduction
Ag Nanoparticle (manufactured by Furukawa Electric Co., Ltd.)
Particle diameter (d50): 50 nm (0.05 μm)
Liquid phase reduction
Au Nanoparticle (manufactured by Furukawa Electric Co., Ltd.)
Particle diameter (d50): 50 nm (0.05 μm)
Liquid phase reduction
<Metal Particle (P3)>
Ni Nanoparticle ($TN-Ni_{100}$ manufactured by TAIYO NIPPON SANSO CORPORATION)
Particle diameter (d50): 100 nm (0.1 μm)
Metal (C): nickel (Ni)
Fe Particle (Hard Grade EW Iron Powder manufactured by New Metals and Chemicals Corporation, Ltd.)
Particle diameter (d50): 5 μm
Metal (C): Iron (Fe)
Al Particle (JTF4 Aluminum Powder manufactured by New Metals and Chemicals Corporation, Ltd.)
Particle diameter (d50): 3 μm
Metal: aluminum (Al)

It is to be noted that the particle diameter (d50) of each metal component described above was measured using a laser diffraction meter (SALD-3100 manufactured by SHIMADZU CORPORATION).

[Thermosetting Resin (R)]
Maleimide resin (BMI-3000 manufactured by DESIGNER MOLECULES INC.

The maleimide resin has a number average molecular weight of about 3000 and is a bismaleimide resin represented by the following formula (9). In the following formula (9), n is an integer of 1 to 10. It is to be noted that the skeleton derived from an aliphatic amine has 36 carbon atoms.

[Formula 6]

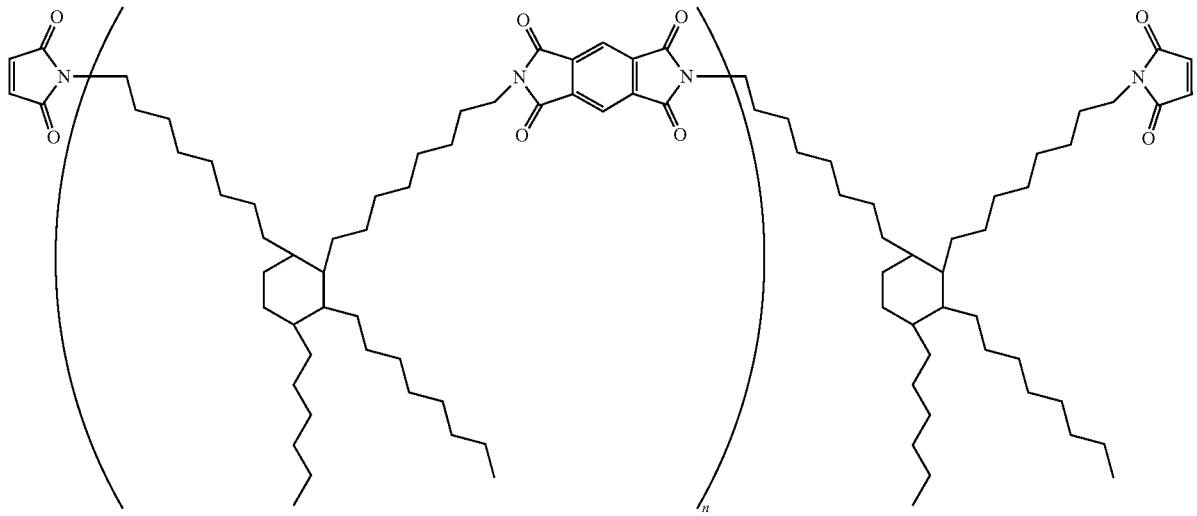

(9)

[Hardening Agent (H)]

2,3-Dimethyl-2,3-diphenylbutane (NOFMER BC™ manufactured by NOF CORPORATION)

The thermosetting resin (R) and the hardening agent (H) were mixed in a mass ratio of 100:5.

[Flux]

<Sulfide-based Compound>

Bis(4-methacryloylthiophenyl)sulfide (manufactured by Sumitomo Seika Chemicals Company, Limited.)

<Organic Phosphine>

4-(Diphenylphosphino)styrene (DPPST (R) manufactured by HOKKO CHEMICAL INDUSTRY CO., LTD.)

<Thiol-based Compound>

2-Dibutylamino-4,6-dimercapto-s-triazine (manufactured by Sankyo Chemical Co., Ltd.)

[Solvent]

Cyclopentanone (manufactured by Tokyo Chemical Industry Co., Ltd.)

Toluene (manufactured by Tokyo Chemical Industry Co., Ltd.)

[Making Metal Particle-Containing Composition]

The thermosetting resin (R), the hardening agent (H), the flux which are shown in Table 1 below, and cyclopentanone which is a solvent were mixed while heating at 50 to 80° C. and an ultrasonic treatment were being performed thereon. After the metal components (P) shown in Table 1 below were added to a resultant resin-containing solution to be mixed, a centrifugal kneading treatment was performed thereon. Subsequently, a defoaming treatment was performed under a reduced pressure of 0.01 MPa for 3 minutes to make a metal particle-containing composition in a paste form.

Example 1

In Example 1, a metal particle-containing composition was made in such a way that the contents of the materials shown in Table 1 in the above-described respective components were in a ratio of 85.6% by mass of the solder alloy particle (P1), 4.3% by mass of the metal particle (P2), 3.2% by mass of the metal particle (P3), 4.2% by mass of the thermosetting resin (R), 0.4% by mass of the hardening agent (H), 1.5% by mass of the flux, and 0.8% by mass of the solvent in the metal particle-containing composition.

Example 2

In Example 2, a metal particle composition was prepared in the same manner as in Example 1, except that the Sn—Zn powder in place of the Sn—Bi powder was used as the solder alloy particle (P1).

Example 3

In Example 3, a metal particle composition was prepared in the same manner as in Example 1, except that the Sn—Ag—Bi—In powder in place of the Sn—Bi powder was used as the solder alloy particle (P1).

Example 4

In Example 4, a metal particle composition was prepared in the same manner as in Example 1, except that the Cu nanoparticle (0.01 μm) in place of the Cu powder (5 μm) was used as the metal particle (P2).

Example 5

In Example 5, a metal particle composition was prepared in the same manner as in Example 1, except that the Cu nanoparticle (0.1 μm) in place of the Cu powder (5 μm) was used as the metal particle (P2).

Example 6

In Example 6, a metal particle composition was prepared in the same manner as in Example 2, except that the Ag nanoparticle (0.05 μm) was further added as the metal particle (P2).

Example 7

In Example 7, a metal particle composition was prepared in the same manner as in Example 3, except that the Au nanoparticle (0.05 μm) was further added as the metal particle (P2).

Example 8

In Example 8, a metal particle composition was prepared in the same manner as in Example 2, except that the Fe particle in place of the Ni nanoparticle was used as the metal particle (P3) and the organic phosphine in place of the sulfide-based compound was used as the flux.

Example 9

In Example 9, a metal particle composition was prepared in the same manner as in Example 1, except that the thiol-based compound in place of the sulfide-based compound was used as the flux.

Comparative Example 1

In Comparative Example 1, a metal particle composition was prepared in the same manner as in Example 1, except that the metal particle (P3) was not used.

Comparative Example 2

In Comparative Example 2, a metal particle composition was prepared in the same manner as in Example 2, except that the metal particle (P3) was not used.

Comparative Example 3

In Comparative Example 3, a metal particle composition was prepared in the same manner as in Example 3, except that the metal particle (P3) was not used.

Comparative Example 4

In Comparative Example 4, a metal particle composition was prepared in the same manner as in Example 1, except that the Al particle in place of the Ni nanoparticle was used as the metal particle (P3).

[Making Electrically Conductive Adhesive Film]

Metal particle-containing compositions containing the materials for the respective components shown in Table 1 below in the above-mentioned respective contents of Examples 1 to 9 and Comparative Examples 1 to 4 were prepared, and toluene was added as a solvent to these metal particle-containing compositions to make slurries. Each of the resultant slurries was stirred with a planetary mixer, and was applied thinly on a release-treated PET film after the stirring. Subsequently, a resultant coating film was dried at 120° C. for 2 minutes to make an electrically conductive adhesive film having a thickness of 40 μm.

[Making Dicing/Die Bonding Film]

Each of the electrically conductive adhesive films of Examples 1 to 9 and Comparative Examples 1 to 4, which were made in the manner as described above, and a dicing tape, which was made according to the procedure described below, were pasted together to make a dicing/die bonding film (electrically conductive adhesive film/coating film of pressure-sensitive adhesive composition/support base material).

<Making Dicing Tape>

A support base material was coated with a pressure-sensitive adhesive composition in such a way that the thickness of a coating film of the pressure-sensitive adhesive composition after drying was 5 μm, and drying was performed at 120° C. for 3 minutes, thereby obtaining a dicing tape. The support base material and the pressure-sensitive adhesive composition were each made by the method described below.

(Pressure-Sensitive Adhesive Composition)

A mixture obtained by mixing n-octyl acrylate (manufactured by OSAKA ORGANIC CHEMICAL INDUSTRY LTD.), 2-hydroxyethyl acrylate (manufactured by OSAKA ORGANIC CHEMICAL INDUSTRY LTD.), methacrylic acid (manufactured by Tokyo Chemical Industry Co., Ltd.), and, as a polymerization initiator, benzoyl peroxide (manufactured by Tokyo Chemical Industry Co., Ltd.) in a weight ratio of 200:10:5:2 was dispersed in an appropriate amount of toluene, and the reaction temperature and the reaction time were adjusted to obtain a solution of an acrylic resin having a functional group. Thereafter, 2 parts by mass of Coronate L (manufactured by Tosoh Corporation) was added as polyisocyanate to 100 parts by mass of this acrylic resin solution, and an appropriate amount of toluene was further added as an additional solvent to perform stirring, thereby making a pressure-sensitive adhesive composition.

(Support Base Material)

Low-density polyethylene resin beads (NOVATEC LL manufactured by Japan Polyethylene Corporation) were melted at 140° C., and a resultant molten material was molded into the form of a long film having a thickness of 100 μm with an extrusion machine, thereby making a support base material.

[Method of Evaluating Electrically Conductive Adhesive Film]

<Shear Adhesive Force>

The dicing/die bonding film made using each of the electrically conductive adhesive films of Examples 1 to 9 and Comparative Examples 1 to 4 was pasted, at 100° C., to the surface of a Si wafer whose rear surface was Au-plated, and was subsequently subjected to dicing to be made into a 5 mm square, thereby obtaining an individualized chip (Au plating/Si wafer/electrically conductive adhesive film). After this chip was subjected to die bonding onto an Ag-plated metal lead frame at 140° C., sintering was performed at 180 to 200° C. for 3 hours, thereby obtaining a sample for measurement. The shear adhesive force of the electrically conductive adhesive film before and after a cold impact test (hereinafter, referred to as "TCT") was measured for obtained sample for measurement.

(Shear Adhesive Force before TCT)

With respect to the obtained sample for measurement, die shear tester (Multipurpose Bondtester Series 4000 manufactured by Nordson Advanced Technology K.K.) was used, and the scratching tool of the Bondtester was made to collide with the side of the semiconductor chip of the measurement sample at 100 μm/sec. On that occasion, the stress at the time when the chip/lead frame bonding was broken was measured as the shear adhesive force at 260° C. When the shear adhesive force before TCT was 3 MPa or more, the evaluation was made such that excellent strength and heat resistance are imparted to the bonding part.

(Shear Adhesive Force after TCT)

As the cold impact test (TCT), a treatment of 200 cycles was performed on the obtained sample for measurement in a temperature range of −40° C. to +150° C. The shear adhesive force of the sample after this treatment was measured by the same method as in the measurement of the shear adhesive force before TCT. When the shear adhesive force after TCT was 1 MPa or more, the evaluation was made such that a bonding part which can retain a satisfactory bonding state even under a severe condition is obtained.

TABLE 1

| | Metal component (P) | | | | | | | |
| --- | --- | --- | --- | --- | --- | --- | --- | --- |
| | Solder alloy particle (P1) | | | Metal particle (P2) | | | Metal particle (P3) | |
| | Material | Solidus temperature [°C.] | Particle diameter (d50) [μm] | Material | Melting point [°C.] | Particle diameter (d50) [μm] | Material | Particle diameter (d50) [μm] |
| Example 1 | Sn—Bi Powder | 139 | 3 | Cu Powder 100% Cu | 1085 | 5 | Ni Nanoparticle 100% Ni | 0.1 |
| Example 2 | Sn—Zn Powder | 199 | 15 | Cu Powder 100% Cu | 1085 | 5 | Ni Nanoparticle 100% Ni | 0.1 |
| Example 3 | Sn—Ag—Bi—In Powder | 196 | 15 | Cu Powder 100% Cu | 1085 | 5 | Ni Nanoparticle 100% Ni | 0.1 |
| Example 4 | Sn—Bi Powder | 139 | 3 | Cu Nanoparticle 100% Cu | 1085 | 0.01 | Ni Nanoparticle 100% Ni | 0.1 |
| Example 5 | Sn—Bi Powder | 139 | 3 | Cu Nanoparticle 100% Cu | 1085 | 0.1 | Ni Nanoparticle 100% Ni | 0.1 |
| Example 6 | Sn—Zn Powder | 199 | 3 | Cu Powder 100% Cu Ag Nanoparticle | 1085 962 | 5 0.05 | Ni Nanoparticle 100% Ni | 0.1 |
| Example 7 | Sn—Ag—Bi—In Powder | 196 | 15 | Cu Powder 100% Cu Au Nanoparticle | 1085 1064 | 5 0.05 | Ni Nanoparticle 100% Ni | 0.1 |
| Example 8 | Sn—Zn Powder | 199 | 15 | Cu Powder 100% Cu | 1085 | 5 | Fe Particle 100% Fe | 3 |
| Example 9 | Sn—Bi Powder | 139 | 3 | Cu Powder 100% Cu | 1085 | 5 | Ni Nanoparticle 100% Ni | 0.1 |
| Comparative Example 1 | Sn—Bi Powder | 139 | 3 | Cu Powder 100% Cu | 1085 | 5 | — | — |
| Comparative Example 2 | Sn—Zn Powder | 199 | 15 | Cu Powder 100% Cu | 1085 | 5 | — | — |
| Comparative Example 3 | Sn—Ag—Bi—In Powder | 196 | 15 | Cu Powder 100% Cu | 1085 | 5 | — | — |
| Comparative Example 4 | Sn—Bi Powder | 139 | 3 | Cu Powder 100% Cu | 1085 | 5 | Al Particle 100% Al | 3 |

| | Binder component Thermosetting resin (R) | Hardening action component Hardening agent (H) | Flux | Heating condition | | | Intermetallic compound | Film form Shear adhesive force | |
| --- | --- | --- | --- | --- | --- | --- | --- | --- | --- |
| | | | | Heating temperature [°C.] | Time [min] | Heating atmosphere | | Before TCT [N/mm$^2$] | After TCT [N/mm$^2$] |
| Example 1 | Bismaleimide | 2,3-Dimethyl-2,3-diphenylbutane | Bis(4-methacryloylthiophenyl) sulfide | 200 | 60 | Nitrogen | Ni—Bi Ni—Bi3 | 20 | 19 |
| Example 2 | Bismaleimide | 2,3-Dimethyl-2,3-diphenylbutane | Bis(4-methacryloylthiophenyl) sulfide | 200 | 60 | Nitrogen | Ni—Zn3 Ni2—Zn11 Ni5—Zn21 | 24 | 22 |
| Example 3 | Bismaleimide | 2,3-Dimethyl-2,3-diphenylbutane | Bis(4-methacryloylthiophenyl) sulfide | 200 | 60 | Nitrogen | Ni—Bi Ni—Bi3 Ni—In Ni2—In3 | 18 | 14 |
| Example 4 | Bismaleimide | 2,3-Dimethyl-2,3-diphenylbutane | Bis(4-methacryloylthiophenyl) sulfide | 200 | 60 | Nitrogen | Ni—Bi Ni—Bi3 | 30 | 29 |

TABLE 1-continued

| | | | | | | | | |
|---|---|---|---|---|---|---|---|---|
| Example 5 | 2,3-Dimethyl-2,3-diphenylbutane | Bis(4-methacryloylthiophenyl) sulfide | 200 | 60 | Nitrogen | Ni—Bi<br>Ni—Bi3 | 26 | 25 |
| Example 6 | 2,3-Dimethyl-2,3-diphenylbutane | Bis(4-methacryloylthiophenyl) sulfide | 200 | 60 | Nitrogen | Ni—Zn3<br>Ni2—Zn11<br>Ni5—Zn21 | 25 | 21 |
| Example 7 | 2,3-Dimethyl-2,3-diphenylbutane | Bis(4-methacryloylthiophenyl) sulfide | 200 | 60 | Nitrogen | Ni—Bi<br>Ni—Bi3<br>Ni—In<br>Ni2—In3 | 19 | 18 |
| Example 8 | 2,3-Dimethyl-2,3-diphenylbutane | 4-(Diphenylphosphino) styrene | 200 | 60 | Nitrogen | Fe3—Zn10<br>Fe5—Zn21<br>Fe—Zn7 | 18 | 16 |
| Example 9 | 2,3-Dimethyl-2,3-diphenylbutane | 2-Dibutylamino-4,6-dimercapto-s-triazine | 200 | 60 | Nitrogen | Ni—Bi<br>Ni—Bi3 | 18 | 17 |
| Comparative Example 1 | 2,3-Dimethyl-2,3-diphenylbutane | Bis(4-methacryloylthiophenyl) sulfide | 200 | 60 | Nitrogen | — | 2 | 0 |
| Comparative Example 2 | 2,3-Dimethyl-2,3-diphenylbutane | Bis(4-methacryloylthiophenyl) sulfide | 200 | 60 | Nitrogen | — | 1.5 | 0.5 |
| Comparative Example 3 | 2,3-Dimethyl-2,3-diphenylbutane | Bis(4-methacryloylthiophenyl) sulfide | 200 | 60 | Nitrogen | — | 1 | 0 |
| Comparative Example 4 | 2,3-Dimethyl-2,3-diphenylbutane | Bis(4-methacryloylthiophenyl) sulfide | 200 | 60 | Nitrogen | — | 0 | 0 |

From the results of Table 1 above, the samples for measurement, obtained using the electrically conductive adhesive films of Examples 1 to 9, exhibited a remarkably high shear adhesive force of 14 N/mm$^2$ or more before and after TCT. Therefore, it was ascertained that by the use of the metal particle-containing compositions made in Examples 1 to 9, bonding between metals in electronic components and the like is achieved in a lead-free manner, bonding with excellent strength and heat resistance is enabled, and, further, a satisfactory bonding state can be retained even if a reliability test, such as a heat shock test or a power cycle test, is carried out under a severe condition.

In contrast, the metal particle-containing compositions of Comparative Examples 1 to 3 do not contain the metal particle (P3), therefore the shear adhesive force of the samples for measurement, obtained using these metal particle-containing compositions, is less than 3 N/mm$^2$ before TCT and is less than 1 N/mm$^2$ after TCT, and it was ascertained that the shear adhesive force is low before and after TCT. In addition, in the metal particle-containing composition of Comparative Example 4, the metal particle (P3) does not contain the metal (C) that forms an intermetallic compound with a metal contained in the solder alloy particle (P1), and therefore the shear adhesive force of the sample for measurement, obtained using this metal particle-containing composition, was 0 before and after TCT.

What is claimed is:

1. A metal particle-containing composition comprising:
    at least one thermosetting resin (R);
    a hardening agent (H); and
    at least three types of metal particles (P) different from one another, wherein
    the metal particles (P) contain:
    a solder alloy particle (P1) containing a tin alloy containing at least one metal (A), wherein the metal (A) is a metal that forms a eutectic crystal with tin at a eutectic temperature of 200° C. or lower;
    at least one metal particle (P2) containing a metal (B) having a melting point exceeding 420° C. in a bulk, the metal particle (P2) having a melting point higher than a solidus temperature of the solder alloy particle (P1);
    at least one metal particle (P3) containing a metal (C) that forms an intermetallic compound with the metal (A) contained in the solder alloy particle (P1);
    the thermosetting resin (R) is a maleic acid imide resin;
    the hardening agent (H) is a radical generating agent;
    the metal (C) is nickel; and
    a particle diameter (d50) of primary particles of the metal particle (P3) is 1 μm or less.

2. The metal particle-containing composition according to claim 1, wherein the metal (A) is at least any one of bismuth, silver, zinc, and indium.

3. The metal particle-containing composition according to claim 1, wherein the metal (B) is at least any one of copper, silver, and gold.

4. The metal particle-containing composition according to claim 1 wherein a particle diameter (d50) of primary particles of the solder alloy particle (P1) is more than 500 nm and 50 μm or less.

5. The metal particle-containing composition according to claim 1, wherein a particle diameter (d50) of primary particles of the metal particle (P2) is more than 1 nm and 50 μm or less.

6. The metal particle-containing composition according to claim 1, wherein a particle diameter (d50) of primary particles of the metal particle (P3) is more than 10 nm.

7. The metal particle-containing composition according to claim 1, wherein a content of the solder alloy particle (P1) contained in the metal particle-containing composition is 50 to 95% by mass based on a total content of the metal particles (P).

8. The metal particle-containing composition according to claim 1, wherein a content of the metal particle (P2) contained in the metal particle-containing composition is 2.5 to 30% by mass based on a total content of the metal particles (P).

9. The metal particle-containing composition according to claim 1, wherein a content of the metal particle (P3) contained in the metal particle-containing composition is 2.5 to 20% by mass based on a total content of the metal particles (P).

10. The metal particle-containing composition according to claim 1, further comprising a flux having one or more phosphor or sulfur atoms in a molecular structure, the phosphor or sulfur atoms being capable of bonding to an oxygen atom without generation of water.

11. The metal particle-containing composition according to claim 10, wherein the flux contains at least one of an organic phosphine represented by the following formula (6), a sulfide-based compound represented by the following formula (7), and a thiol-based compound represented by the following (8);

provided that R in the following formulas (6), (7), and (8) each independently represent an organic group and are optionally the same with or different from one another,

[Formula 1]

(6)

(7)

(8)

12. The metal particle-containing composition according to claim 11, wherein the organic phosphine contains 4-(diphenylphosphino)styrene.

13. The metal particle-containing composition according to claim 11, wherein the sulfide-based compound contains at least one of bis(hydroxyphenyl)sulfide, bis(4-acryloylthiophenyl)sulfide, 2-methylthiophenothiazine, bis(2-methacryoylthioethyl)sulfide, and bis(4-methacloylthiopheny 1)sulfide.

14. The metal particle-containing composition according to claim 11, wherein the thiol-based compound contains at least one of 2-dibutylamino-4,6-dimercapto-s-triazine, 2,4,6-trimercapto-s-triazine, 2-pyridinethiol, 2-pyridinemethanethiol, and 3-pyridinemethanethiol.

15. An electrically conductive adhesive film formed by the metal particle-containing composition according to claim 1.

* * * * *